US011208336B2

(12) United States Patent
Der Minassians et al.

(10) Patent No.: US 11,208,336 B2
(45) Date of Patent: Dec. 28, 2021

(54) FULLY REGENERATIVE DISTILLATION SYSTEM FOR LOW-COST WATER DESALINATION

(71) Applicant: Amantsy, Inc., Oakland, CA (US)

(72) Inventors: Artin Der Minassians, Oakland, CA (US); Seth R. Sanders, Berkeley, CA (US)

(73) Assignee: AMANTSY, INC., Oakland, CA (US)

( * ) Notice: Subject to any disclaimer, the term of this patent is extended or adjusted under 35 U.S.C. 154(b) by 0 days.

(21) Appl. No.: 16/788,140

(22) Filed: Feb. 11, 2020

(65) Prior Publication Data

US 2020/0255302 A1    Aug. 13, 2020

Related U.S. Application Data

(60) Provisional application No. 62/804,109, filed on Feb. 11, 2019.

(51) Int. Cl.
| | |
|---|---|
| *C02F 1/04* | (2006.01) |
| *C02F 1/08* | (2006.01) |
| *B01D 1/28* | (2006.01) |
| *B01D 5/00* | (2006.01) |
| *C02F 103/08* | (2006.01) |

(52) U.S. Cl.
CPC ............ *C02F 1/043* (2013.01); *B01D 1/2887* (2013.01); *B01D 1/2893* (2013.01); *B01D 5/0006* (2013.01); *B01D 5/006* (2013.01); *B01D 5/0039* (2013.01); *C02F 1/041* (2013.01); *C02F 1/08* (2013.01); *C02F 2103/08* (2013.01); *C02F 2303/10* (2013.01)

(58) Field of Classification Search
CPC . C02F 1/041; C02F 1/043; C02F 1/08; B01D 1/2887; B01D 1/2893; B01D 5/0006; B01D 5/0039; B01D 5/006
See application file for complete search history.

(56) References Cited

U.S. PATENT DOCUMENTS

| | | | | |
|---|---|---|---|---|
| 3,568,766 | A * | 3/1971 | Thomas | F28F 1/426 165/181 |
| 4,330,373 | A * | 5/1982 | Liu | B01D 3/065 202/174 |

(Continued)

FOREIGN PATENT DOCUMENTS

| | | | | |
|---|---|---|---|---|
| RU | 2576295 C1 * | 2/2016 | | C02F 1/04 |
| WO | WO-2004069370 A1 * | 8/2004 | | B01D 5/0093 |

*Primary Examiner* — Jonathan Miller
(74) *Attorney, Agent, or Firm* — Soquel Group LLC

(57) ABSTRACT

A desalination device includes a sealed desalination chamber with two compartments, an evaporator space that contains saline water, and a condenser space that contains fresh water, a saline water distribution mechanism that directs the saline water into the evaporator space, a vapor compressor that directs a stream of pressurized freshwater vapor into the condenser space, and an integrated regenerative boundary between the evaporator space and the condenser space that has two sides, an evaporation surface and a condensation surface, enabling the pressurized freshwater vapor to condense on the condensation surface to generate freshwater, and where the latent heat of the condensation process transfers across the integrated regenerative boundary into the evaporator space and evaporates a portion of the saline water to produce freshwater vapor.

19 Claims, 12 Drawing Sheets

(56) References Cited

U.S. PATENT DOCUMENTS

| | | | | |
|---|---|---|---|---|
| 5,062,927 A * | 11/1991 | Stout | ................. | B01D 1/26 |
| | | | | 203/89 |
| 5,968,321 A * | 10/1999 | Sears | ................. | B01D 1/28 |
| | | | | 202/172 |
| 2005/0121304 A1* | 6/2005 | Beckman | ................. | C02F 1/08 |
| | | | | 203/2 |
| 2007/0137996 A1* | 6/2007 | Beckman | ............. | B01D 1/0094 |
| | | | | 202/158 |
| 2008/0017326 A1* | 1/2008 | Hong | ................. | B01D 1/26 |
| | | | | 159/24.1 |
| 2017/0144892 A1* | 5/2017 | McCluskey | ............. | C02F 1/004 |
| 2017/0350405 A1* | 12/2017 | Sozer | ................. | F04D 29/284 |

* cited by examiner

FULLY REGENERATIVE DISTILLATION SYSTEM FOR LOW-COST WATER DESALINATION

CROSS REFERENCE TO RELATED APPLICATIONS

This application claims the benefit of priority to U.S. Provisional Application No. 62/804,109, filed on Feb. 11, 2019. The foregoing application is incorporated by reference herein in its entirety for all purposes.

BACKGROUND

1. Field of Art

This description generally relates to desalination.

2. Description of the Related Art

Desalination, a process to separate and remove the dissolved salt and mineral components from saline water, is emerging as an important societal-scale function, due to impacts of climate change, population growth, and human migration patterns. Fresh water scarcity can be addressed in coastal regions by direct desalination of seawater or brackish water in estuaries. In many other regions, ground water may not be potable or suitable for agriculture, due to its high salinity. Again, desalination can enable much greater utilization of available ground water resources that are otherwise corrupted by high salinity levels.

Reverse osmosis (RO) desalination presently dominates the desalination space, due to its favorable energetic efficiency and capital cost. On the other hand, disposal of rejected brine, a byproduct of desalination, is a challenge due to potential contamination at the disposal site and environs. One solution is to achieve a high recovery rate, resulting in highly concentrated brine—up to the saturation level of a saline solution, i.e., about 25% of dissolved salt by mass fraction—which results in minimal brine volume and therefore reduces the corresponding disposal cost.

In the case of ground water desalination, disposal of the residual brine can be a challenge for similar reasons explained above. In such cases, a capability of very high recovery rates, resulting in highly concentrated brine, allows for minimal brine volume should the residual brine be directly transported away, by truck for example.

Some industrial processes, for example "fracking" and conventional oil and gas production, generate very large quantities of brine as a byproduct of production. The resulting brine often requires disposal at remote locations from that of the initial well site. In this scenario, the capability of concentrating the brine to very high concentration levels enables reduced volume transport for eventual disposal of such brine. Although this process of concentrating brine is not directly desalination, but rather the byproduct output of a desalination process, it may be carried out by desalination processes.

Desalination processes are generally of the distillation or membrane type processes, with reverse osmosis (RO) standing as the dominant membrane process. RO desalination is a relatively modern process, invented in the second half of the 20th century, and further developed into a relatively mature process in the 21st century.

RO desalination is generally energy efficacious since the process can meet the asymptotic limit of minimum energy requirement per unit of separation (desalination). Nevertheless, RO has drawbacks.

1. One common challenge to RO systems is the maintenance cost associated with wearout of the membranes used in the process.

2. RO systems also require very high pressures to desalinate saline solutions with salinity in the range of seawater (~3.5% salt by mass fraction), and thus require robust pump and plumbing systems. These heavy-duty components, necessarily built from stainless steel alloys to avoid corrosion, are costly.

3. A related challenge is that the rejected brine is also pressurized, and in order to avoid energy losses associated with the work that went into pressurizing the brine, an energy recovery system may be incorporated. When incorporated, such energy recovery systems add to the system cost. If energy recovery is not incorporated, energy performance is degraded.

4. Since very high pressures are required to desalinate from highly saline water, RO is generally not applicable to producing very highly concentrated brine as a byproduct. Thus, secondary processes are usually required in conjunction with an RO system to produce very highly concentrated brine as the rejected byproduct.

5. Membranes generally require periodic flushing with fresh water to clear out accumulated particulate matter, inclusive of biological matter.

6. The RO process is sensitive to the pressure that is applied to the saline feedwater to overcome the osmotic pressure and force the water molecules to pass through the membrane. Intermittent operation—due to a power loss event, for instance—results in the loss of hydraulic pressure and uncontrolled forward osmosis where fresh water reverses its path.

Distillation processes are much older than the membrane processes. These conventionally have been based on application of thermal input to effect evaporation, followed by condensation to recover the freshwater product. Such a single-pass system is extremely inefficient, though still possibly useful with excess "free" thermal energy. More energetically efficient distillation processes utilize multiple stages, organized to serially process thermal power, such that heat recovered in condensation of one stage drives evaporation in a subsequent stage. The multi-stage systems are thus more effective from an energy efficiency viewpoint, but nevertheless, have not yet been shown to compete well economically with the modern RO systems.

One consideration is on the use of only low temperatures so as to avoid scaling on the heat exchanger surfaces that are exposed to saline water. Scaling generally becomes an issue with temperatures in the range of 70° C. and above. Thermal stacking of many stages leads to a somewhat higher temperature input heat requirement, with the subsequent scaling hazard. The multi-stage systems also require relatively complex integration for thermal efficiency, and to implement the required plumbing.

SUMMARY

The subject invention pertains to a desalination device that performs a regenerative distillation process. It is a non-membrane, chemical-free, desalination technology that eliminates the operation and maintenance (O&M) cost associated with wearout of the membrane and the need for heavy-duty high-pressure pumps, plumbing, and energy recovery devices that are critical components of RO desalination process.

The invention employs the thermodynamic principles of evaporation and condensation to distill freshwater from saline water. As such, it achieves very low specific energy levels, close to the theoretical limit of the minimum energy of desalination. The invention is not sensitive to the salinity level or chemical composition of the saline water that often is responsible for dysfunction, damage, and fouling of the RO membrane.

Embodiments are directed to a desalination device that has an evaporator space and a condenser space, which are two adjacent, distinct, physical volumes within a desalination chamber that is hermetically sealed. The evaporator space and the condenser space are separated by an internal regenerative enthalpy exchange medium, referred to herein as an integrated regenerative boundary. The integrated regenerative boundary transfers the latent heat of phase change between condenser space and evaporator space, and sustains a distillation process without any need for external heat exchange.

Further embodiments are directed to a distillation process for desalination of saline water (SW) performed by a desalination device. The process proceeds from an initial state in which SW is received inside an evaporator space. A latent heat of evaporation is then added to SW in the evaporator space to turn a portion of the SW into saturated vapor, resulting in a transition to a second state. Next, a vapor compressor raises the pressure of the saturated freshwater (FW) vapor and directs a further superheated pressurized FW vapor into a condenser space resulting in a transition to a third state. In the condenser space, the latent heat of condensation is removed from the pressurized water vapor to turn it into saturated freshwater liquid resulting in a final transition to a fourth state. FW, which is the product of the distillation process, is then removed from the condenser space.

Embodiments further relate to an integrated regenerative boundary that includes a condenser, an evaporator, and a heat exchanger so as to facilitate the required transfer of heat from a condenser space to an evaporator space inside a sealed chamber. In certain embodiments, the integrated regenerative boundary is divided into several subsections and the subsections are arranged radially to maximize space utilization. Each subsection incorporates a large surface area on each of its two respective surfaces, i.e., the surfaces that face the evaporator space and the condenser space. The integrated regenerative boundary separates and partitions the volume inside the desalination chamber into an inner evaporator space and an outer condenser space. In certain embodiments, the integrated regenerative boundary is made of a thin film that is folded into fine pitches, which efficiently packs the heat transfer surface area into a specific volume.

Embodiments relate to a vapor compressor disposed between the evaporator space and the condenser space. The vapor compressor extracts freshwater vapor (FW vapor) from the evaporator space, raises the vapor pressure, and hence, the temperature of the FW vapor stream and delivers a further pressurized freshwater vapor into the condenser space. In certain embodiments, the vapor compressor uses a centrifugal impeller that is powered by an electric motor.

Embodiments are directed to a desalination device, that includes a sealed desalination chamber that has two compartments, an evaporator space that contains saline water, and a condenser space that contains fresh water, a saline water distribution mechanism within the chamber for receiving incoming saline water and directing it into the evaporator space, a vapor compressor within the chamber that receives freshwater vapor from the evaporator space and generates a stream of pressurized freshwater vapor into the condenser space, and an integrated regenerative boundary between the evaporator space and the condenser space that has an evaporation surface and a condensation surface, where the pressurized freshwater vapor condenses on the condensation surface to generate freshwater, which flows to the bottom of the condenser space, and wherein the latent heat of the condensation process transfers across the integrated regenerative boundary into the evaporator space, and wherein the transferred heat evaporates the saline water in the evaporator space to produce freshwater vapor.

Further embodiments are directed to a process for the desalination of water, including receiving incoming saline water into an evaporator space inside a sealed chamber, enabling the incoming saline water to flow down an evaporator surface inside evaporator space, heating the saline water, evaporating a portion of the saline water to become freshwater vapor, pressurizing the freshwater vapor, directing the pressurized freshwater vapor into a condenser space inside the sealed chamber, removing enthalpy from the pressurized freshwater vapor by a condensation surface inside the condenser space; and condensing the pressurized freshwater vapor on the condensation surface to create freshwater.

BRIEF DESCRIPTION OF DRAWINGS

Non limiting and non exhaustive embodiments of the present invention are described with reference to the following drawings. In the drawings, like reference numerals refer to like parts throughout the various figures unless otherwise specified.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, or devices. The following detailed description is, therefore, not to be taken in a limiting sense.

I. Overview

The present invention pertains to a type of distillation process, referred to herein as a regenerative distillation process. It is a non-membrane, chemical-free, desalination technology that eliminates the operation and maintenance (O&M) cost associated with wearout of a membrane and the need for heavy-duty high-pressure pumps, plumbing, and energy recovery devices that are critical components of reverse osmosis (RO) desalination process. This technology employs the thermodynamic principles of evaporation and condensation to distill freshwater from saline water. As such, it can achieve very low specific energy (kWh/m$^3$ of produced freshwater) levels, close to the theoretical limit of the minimum energy of desalination. Unlike RO, this invention is not sensitive to the salinity level or chemical composition of the saline feedwater that often is responsible for dysfunction, damage, and fouling of the RO membrane.

Figure 1:
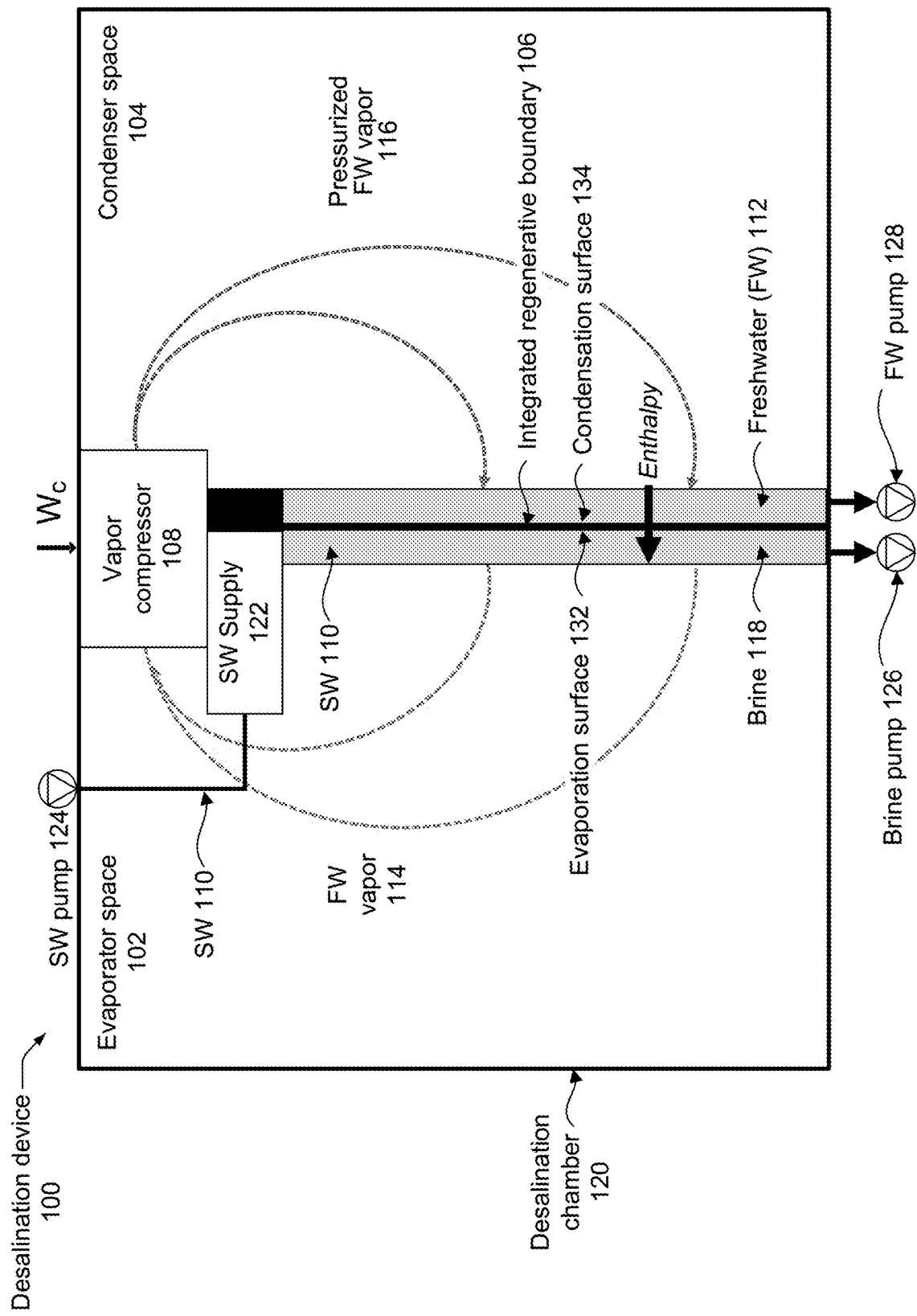
FIG. 1 is a block diagram of one embodiment of a desalination device.

FIG. 1 is a block diagram of one embodiment of a desalination device 100. Device 100 incorporates an evaporator space 102 and a condenser space 104, which are two adjacent physical volumes within a desalination chamber 120 that is hermetically sealed. Evaporator space 102 and condenser space 104 are separated by an internal regenerative enthalpy exchange medium, referred to herein as an integrated regenerative boundary 106 (also referred to simply as boundary 106). Boundary 106 transfers the latent heat of phase change between condenser space 104 and evaporator space 102, and sustains a distillation process without any need for external heat exchange. Boundary 106 allows enthalpy exchange to occur with a small temperature difference (typically a fraction of a degree Celsius up to 2 degrees Celsius) between the two spaces which, in turn, minimizes the energy of desalination, keeping it close to its theoretical limit. Energy of distillation is the required input work to separate a unit of freshwater volume from saline water, often measured in kWh/m$^3$ of produced freshwater. As a result, this technology is significantly more efficient than prior art thermal desalination processes.

Saline water (SW) is supplied to device 100 by a SW pump 124 that supplies saline water (SW) 110 to a SW supply unit 122 in an evaporator space 102. Saline water 110 flows downward along one side of the bundary 106, referred to as an evaporation surface 132. Water content of saline water 110 evaporates in evaporator space 102 to create water vapor 114. The remaining SW, or referred to as brine 118, is removed at the bottom of evaporator space 102 by a brine pump 126. Brine pump 126 may be located outside desalination chamber 120 or it may be located inside chamber 120 and be installed in-line with the brine flow.

Water vapor 114 enters vapor compressor 108 and leaves it as a superheated pressurized freshwater (FW) vapor 116 stream. As referred to herein, vapor compressor 108 is a device, component or subsystem that raises the pressure and temperature of water vapor 114 so that it may condense at a sufficiently higher temperature than that of the evaporation process. Vapor compressor 108 supplies the exact minimal work, W_c, needed for the desalination process. Progressively, FW vapor 116 releases its latent heat, and condenses to a liquid state on a condensation surface 134 of boundary 106 as freshwater (FW) 112. FW 112 flows downward on condensation surface 134 and, similar to the brine discharge, is collected at the bottom of the condenser and is directed out of device 100 as a freshwater stream or product. Freshwater 112 is removed from desalination chamber 120 by a FW pump 128. FW pump 128 may be located either inside or outside of desalination chamber 120.

There is a precise balance of thermal energy (enthalpy) flow between that required to be added to the evaporator space, and that required to be recovered in the condenser space. For regenerative exchange of the latent heat between the condenser space and the evaporator space, the saturation temperature of FW in the condenser space must be higher than that of SW in the evaporator space. This is achieved by inserting vapor compressor 108 between evaporator space 102 and condenser space 104. While extracting FW vapor 114 from evaporator space 102, vapor compressor 108 raises the pressure, and hence, the temperature of the FW vapor stream that passes through vapor compressor 108 and delivers a further pressurized freshwater vapor 116, also referred to as FW vapor 116, to condenser space 104.

The thermodynamic cycle requires no external thermal energy injection or rejection. Mechanical work W_c is the only energy source for the cycle, which is provided as electrical power making the system flexible with respect to its power source.

Another aspect of this technology is that, unlike Reverse Osmosis, it is insensitive to the quality (salinity or total dissolved solids) of the saline feedwater. That is, device 100 can process saline water 110 with a wide range of salinity levels, which makes it suitable for non-traditional water resources, including inter alia brackish water, wastewater, oil & gas produced water, and discharged brine of a typical RO plant. Moreover, this technology can achieve a high freshwater recovery ratio by rejecting saturated brine, i.e., brine at about 25% salinity by mass fraction, compared to the 6%-7% of rejected brine salinity for a typical RO process. This feature not only maximizes the freshwater recovery ratio but also dramatically reduces the brine volume and the associated brine transport and disposal costs.

Desalination Thermodynamic Cycle

Figure 2:
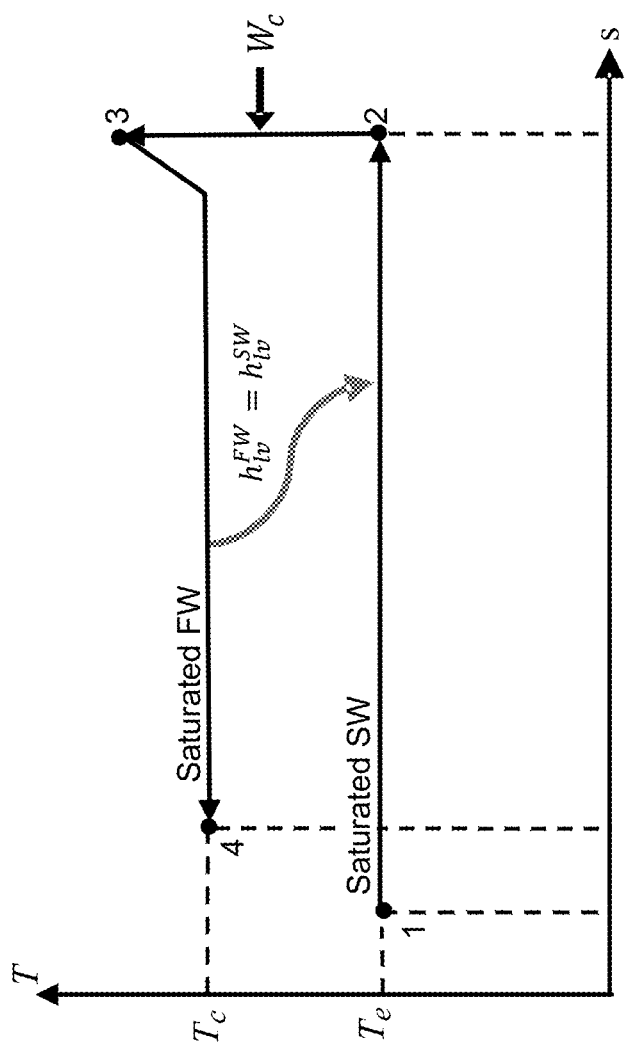
FIG. 2 illustrates a temperature-entropy (T-s) thermodynamic diagram of the distillation process for the desalination of saline water (SW) using the desalination device with an internal regenerative approach.

FIG. 2 illustrates a temperature-entropy (T-s) thermodynamic diagram of the distillation process for desalination of saline water (SW) using device 100. In FIG. 2 thermodynamic states are represented by solid circles. Directed lines indicate one or more steps or processes that result in a change in temperature and/or entropy level and also result in a transition to a new state. States 1 and 2 demonstrate the evaporation process of SW while states 3 and 4 pertain to condensation of pure water, or freshwater, FW. The processing steps performed by device 100 as saline water is processed and transitions from state 1 to state 2 to state 3 to state 4 is described in Table 1, below. The vertical axis refers to temperature while the horizontal axis refers to entropy, labeled s.

At state 1 incoming SW 110 enters device 100 and flows into evaporator space 102. The vapor pressure of SW is determined by its temperature and salinity level. For a given operating temperature, SW with higher salinity has lower vapor pressure. In evaporator space 102, a portion of the water content of the SW stream is separated (evaporated) as FW vapor 114, and the residual saline water with higher salinity leaves evaporator space 102 as brine 118 by brine pump 126, i.e., a discharge from device 100.

At state 1, SW is saturated liquid at the temperature of incoming SW 110, $T_e$, in evaporator space 102. A latent heat of evaporation, $h\_lv^{SW}$, is then added to SW 110 in evaporator space 102 to turn SW 110 into saturated vapor as SW transitions from state 1 to state 2. Note that the vapor pressure of FW 114, at equilibrium, is higher than that of SW at any temperature and any salinity level. Therefore, FW vapor is always in a superheated state within evaporator space 102. In condenser space 104, the latent heat of condensation, $h\_lv^{FW}$, is removed from the pressurized water vapor 116 to turn it into saturated freshwater liquid 112 as the FW transitions from state 3 to state 4. FW 112 is then removed from the system as the FW product of distillation by FW pump 128.

While extracting FW vapor 114 from evaporator space 102, vapor compressor 108 raises the pressure, hence, the temperature of that FW vapor stream and delivers a further superheated pressurized fresh water vapor 116 to condenser space 104. This is represented as a transition from state 2 to state 3. Since the saturation temperature of condenser space 104, $T\_c$, is higher than $T\_e$, the recovered energy from condensation of FW can flow conductively to evaporator space 102. If one were able to realize an isentropic vapor compression function, with no drive losses, the input work, $W\_c$ would equal exactly the chemical energy input required to separate FW from SW in the desalination process.

Device 100 operates at any desired temperature. The operating temperature determines the effective average pressure level of evaporator space 102 and of condenser space 104, whereas vapor compressor 108 imposes the pressure difference between these two spaces. Operating at typical ambient temperatures or SW feed temperatures (10° C. to 30° C.) requires low average operating pressures for the system, that is 1%-5% of ambient pressure. Therefore, for such a temperature range, all components operate inside a low-pressure enclosure, desalination chamber 120.

If the operating temperature is allowed to increase to 100° C., or slightly above, the vapor pressure rises to ambient level, or slightly above, obviating the need for a vacuum rating for desalination chamber 120.

Integrated Regenerative Boundary

To realize a fully regenerative process, integrated regenerative boundary 106 integrates a condenser, an evaporator, and a heat exchanger so as to facilitate the required transfer of heat. These elements are arranged so as to fully separate condenser space 104 and evaporator space 102. This arrangement enables the latent heat of condensation that is released in condenser space 104 to be transferred to evaporator space 102 through thermal conduction, thus providing the required latent heat of evaporation to the saline water in evaporator space 102. Furthermore, since the condenser and the evaporator spaces are fully separated, there is no hazard such as mixing of FW with SW when device 100 operation is interrupted. As explained above with reference to FIG. 2, condensation occurs at a slightly higher temperature than that of evaporation. The temperature difference between condensation and evaporation is just enough to overcome the thermal resistance of the conduction path, while supporting the necessary heat flow. Thus, an efficacious design of the integrated evaporator and condenser calls for minimization of the thermal impedance between evaporator space 102 and condenser space 104.

Embodiment of Desalination Device

Figure 3:
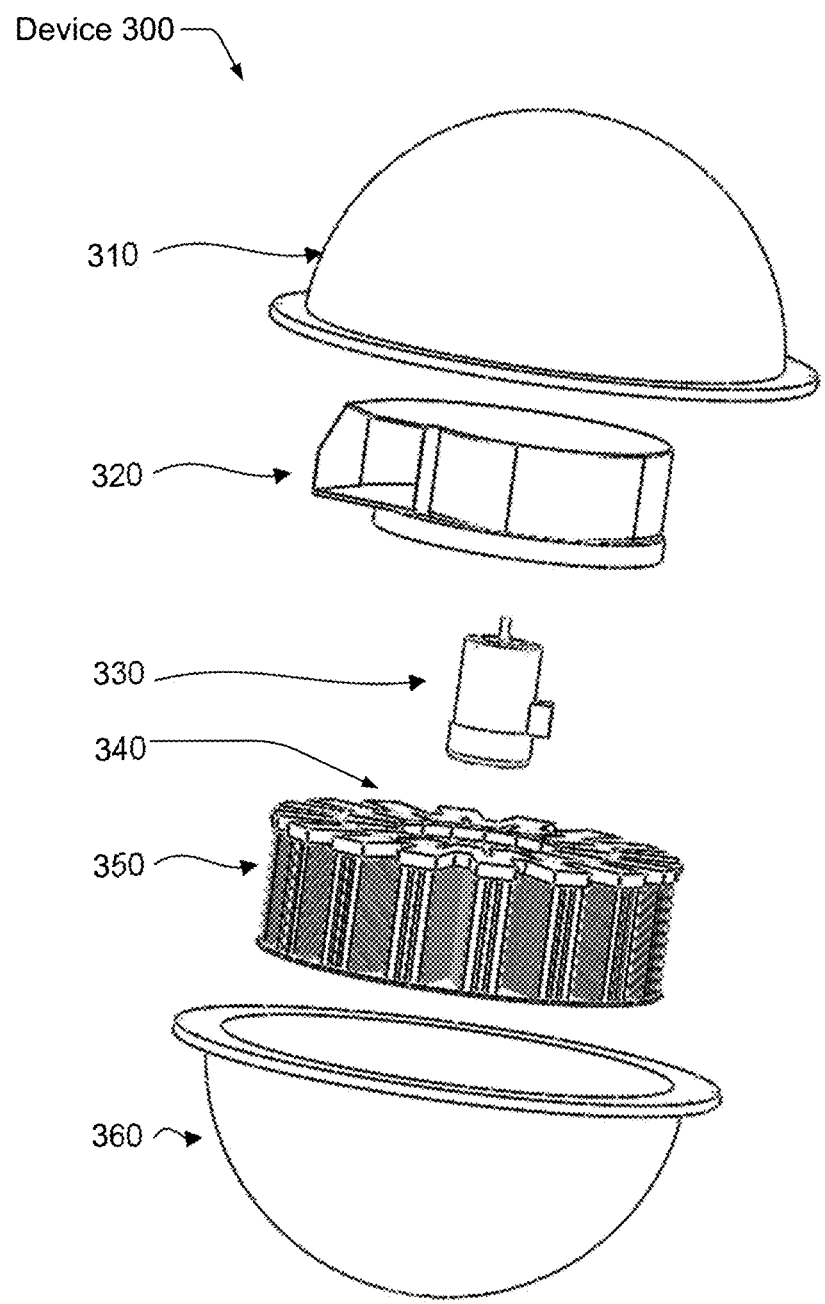
FIG. 3 is an exploded view of one embodiment of the desalination device.

FIG. 3 is an exploded view of one embodiment of desalination device 100. Desalination chamber enclosures 310 and 360, which together form an embodiment of desalination chamber 120, separate the ambient atmosphere from the lower-pressure internal working volumes of the device, which predominantly contain water vapor flowing through the device. In certain embodiments, chamber enclosures 310 and 360 are two half-chambers, each in the shape of a clam shell half. Each half-chamber may be fabricated from various plastics, including ABS, plexiglass, lexan, and many other plastics. Fabrication may be by mold forming from a blank sheet, or by blow forming. The half chambers may also be fabricated from corrosion resistant metals, such as stainless steel alloys, and fabricated by various forming processes.

Vapor compressor 320 is an embodiment of vapor compressor 108. In certain embodiments, vapor compressor 320 uses a centrifugal impeller, described hereinbelow with reference to FIG. 7, since such devices are well suited to working at the noted pressure rise levels. Electric motor 330 spins the impeller of vapor compressor 320. Motor 330 is located inside the working space of the desalination system and is connected to the impeller by direct physical mechanical coupling. In this arrangement, since motor 330 is exposed to saline water and water vapor, its moving parts and internal insulation are chosen to withstand the corrosive working environment. Washdown or submersible motors are useful for this application. Motor 330 can also be located outside of chamber 120 to avoid any direct contact with the corrosive elements. For such an arrangement, a magnetic coupling may be utilized to transfer the motor 330 torque to the compressor impeller via magnetic field coupling without any direct mechanical connection between motor 330 and the impeller.

As previously discussed, to realize a fully regenerative process, an integrated regenerative boundary 350, which is an embodiment of boundary 106, integrates a condenser, an evaporator, and a heat exchanger so as to facilitate the required transfer of heat. A saline water supply 340, which is an embodiment of SW supply 122, which includes a SW distribution vessel that selectively distributes incoming saline water 110 to an upper edge of an evaporation surface of integrated regenerative boundary 350, while blocking SW distribution to a condenser surface of boundary 350.

Figure 4A:
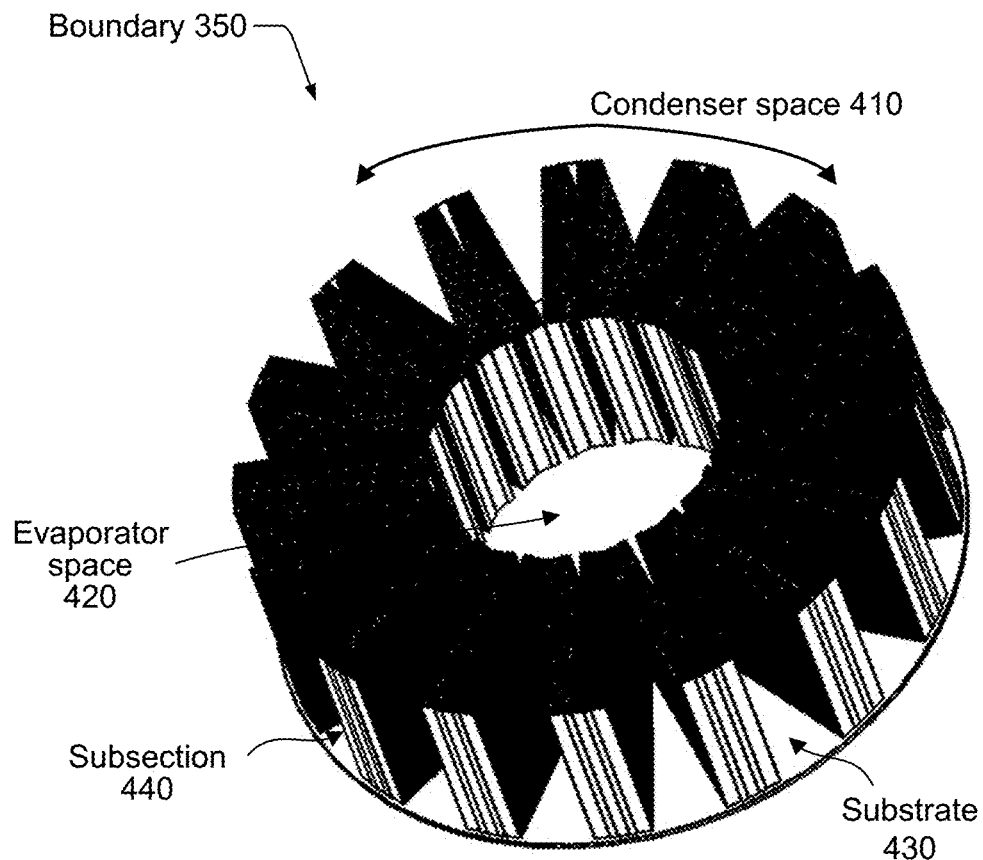
FIGS. 4A and 4B are illustrations of one embodiment of an internal regenerative boundary.
Figure 4B:
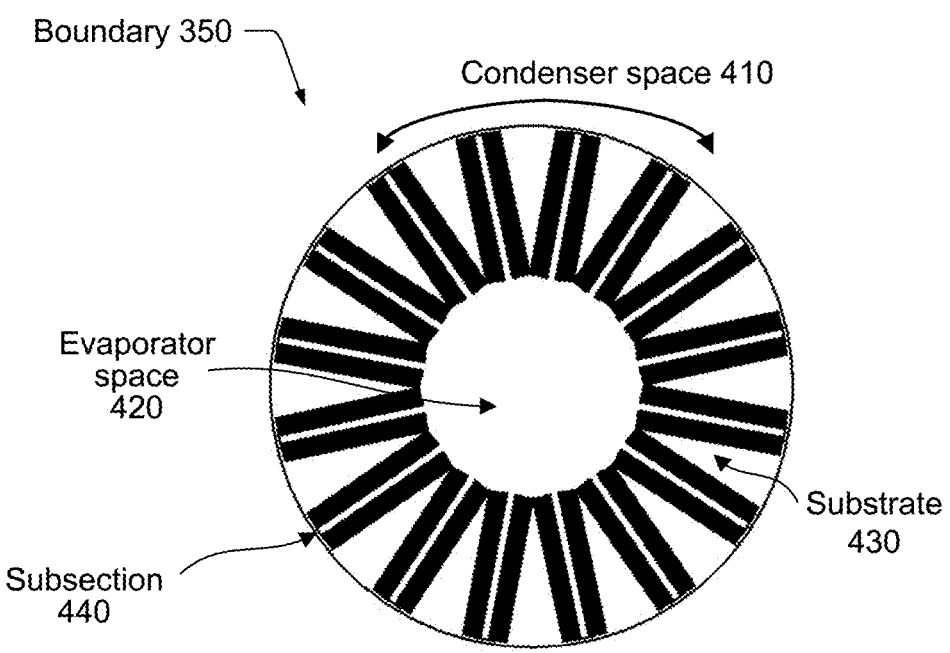

FIGS. 4A and 4B provide further details for one embodiment of integrated regenerative boundary 350. FIG. 4A is a top isometric view of integrated regenerative boundary 350. FIG. 4B is a top view of the integrated regenerative boundary 350. Boundary 350 has a geometric arrangement that minimizes thermal impedance between evaporator space 102 and condenser space 104. Boundary 350 is divided into several subsections 440 and the subsections are arranged radially to maximize space utilization. Thermal impedance is minimized by each subsection incorporating a large surface area on each of its two respective surfaces, i.e., the surfaces that face evaporator space 102 and condenser space 104. Boundary 350 separates and partitions the volume inside desalination chamber 120 into an inner evaporator space 420 and an outer condenser space 410. In this embodiment, evaporator space 420 is an embodiment of evaporator space 102 and condenser space 410 is an embodiment of condenser space 104. In other embodiments, these roles may be reversed, in which case space 420 would act as condenser space 104 and space 410 would act as evaporator space 102.

Figure 5:
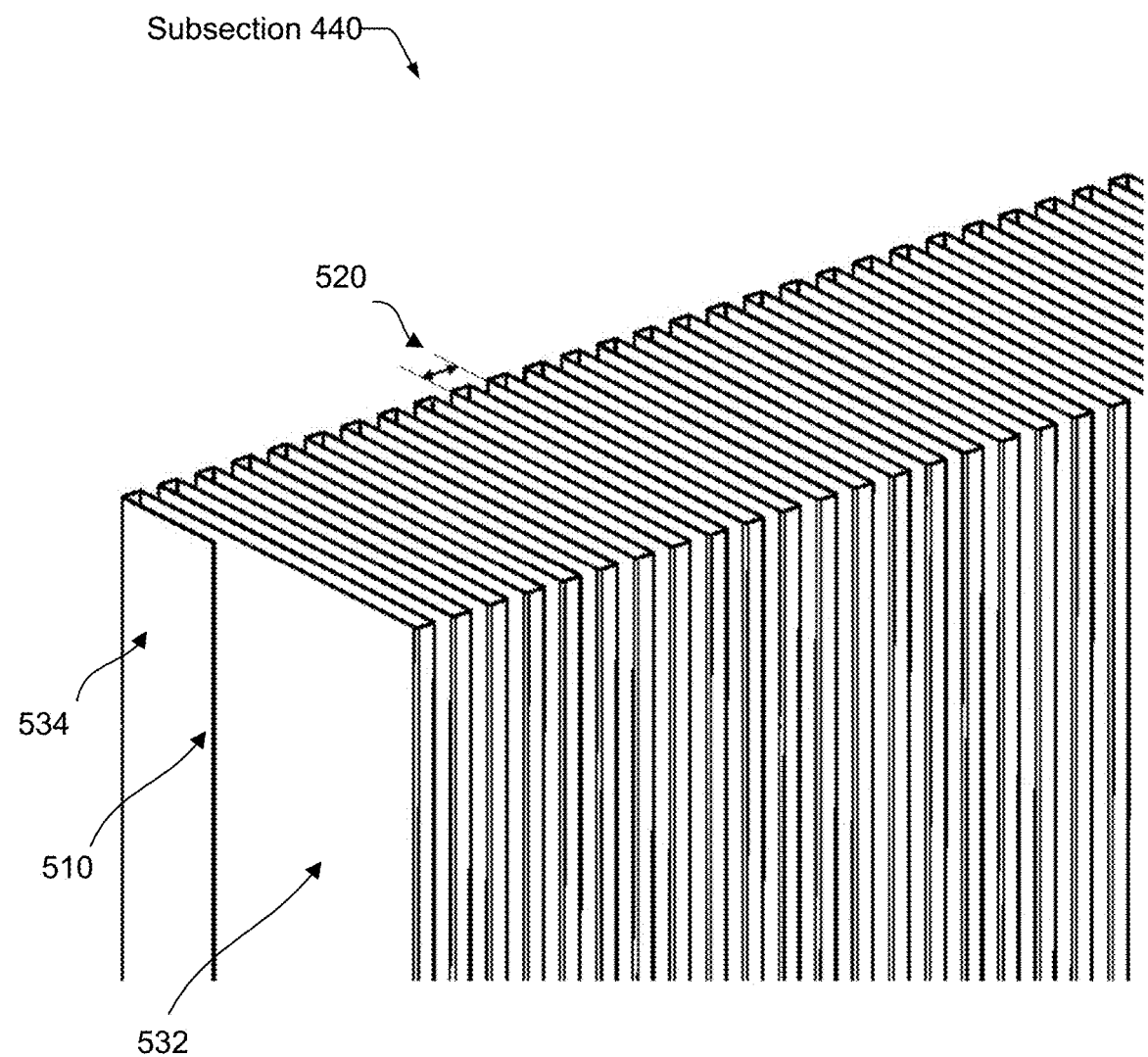
FIG. 5 provides additional detail for the internal regenerative boundary.

FIG. 5 illustrates details of one embodiment of a radial subsection 440 of internal regenerative boundary 350. The evaporation and condensation processes occur on the two opposite sides of a film 510. One side of film 510 is a condensation surface 534 and the other side is an evaporation surface 532. Condensation surface 534 is an embodiment of condensation surface 134 and evaporation surface 532 is an embodiment of evaporation surface 132.

In this embodiment, film 510 is a sheet of a thin material that is folded into fine pitches, referred to as fine-pitch folds 520. In certain embodiments, folds 520 have a pitch range of 1-5 mm, which allows for a very efficacious packing of heat transfer surface area into an allowed volume. Limitations on pitch are due to manufacturing constraints which point to minima in the range of 1 mm. FIG. 5 shows a rectangular shape for the folds. Other shapes are possible such as triangular folds and so on. With this configuration, temperature drop in heat transfer is held to the extremely low levels (e.g., fraction of a degree Celsius up to 2 degrees Celsius), as noted above, since the transmissive thermal resistance of a thin foil is extremely low. The overall area of condensation surface 134 (534) and overall area of evaporation surface 132 (532) are essentially equal, and determine the heat transfer capacity given the allowed temperature drop, and in turn the overall capacity of the process. Many geometrical arrangements, other than that depicted in FIGS. 4A, 4B and 5, are feasible for boundary 106.

Thin film 510 is made of a stainless steel alloy resistant to saline water corrosion to minimize thermal impedance. Stainless steel alloys such as 316, 316L, 317, or 317L are exemplary preferred materials, but many other materials that are corrosion resistant are also suitable. These include coated metals as well as plastics, such as nylon. Preferred film thicknesses are in the range of 25 micrometers to 250 micrometers. Various geometric arrangements involving folding, and so on, can and should be employed to allow for large area without occupying an inordinate volume. This arrangement eliminates any need for providing an external source or sink of thermal energy to sustain the desalination process, irrespective of the operating temperature of the system.

Hydrophilic Surface Treatment of the Integrated Regenerative Boundary

The effectiveness of boundary 106 depends on effective transfer of the latent heat from condenser space 104 to evaporator space 102. An effective heat transfer requires thermal resistance of the conduction path between a layer of FW 112 on condensation surface 134 and a layer of SW 110 on evaporation surface 132 to be minimized. This means that the two surfaces on either side of the boundary 106 must be utilized effectively and the surfaces should ideally be entirely wetted by the two liquids, the two liquids being FW 112 and SW 110. Thus, the surfaces of boundary 106 may each be chemically treated at a molecular level in order to change the surface tension properties and significantly reduce the contact angle of the liquid and the boundary surface to achieve suitable hydrophilic or super-hydrophilic behavior. This treatment ensures that the surface areas on either side of the boundary are wetted thoroughly to facilitate effective heat transfer. Metal foils may be treated to make them hydrophilic by low-pressure plasma processes, ambient-pressure plasma processes, and by dip-coating with hydrophilic coatings. Example coatings include hydrophilic silicones and siloxanes, polyethylene oxide, polyethylene glycol silane, $TiO\_2$ and $TiO\_2/SiO\_2$ solutions with proper pH and nanoparticle size.

Liquid layer thickness of FW 112 and SW 110, on each of the two respective sides of boundary 106 is ideally in the range of 5-200 micrometers. Thin liquid layers are essential for realizing sufficiently low thermal impedance from the FW liquid-vapor interface through the FW 112 liquid layer thickness, the thickness of boundary 106, and subsequently through the SW 110 liquid layer thickness, to the SW liquid-vapor interface. Thicker liquid layers result in larger temperature differences between the two vapor spaces, requiring larger compressor mechanical work input, and degraded efficiency. Thus, hydrophilic surface treatment is essential for complete distribution of the liquids over each of the respective sides of boundary. Still, each of the liquid layers must have some minimal thickness in order to support gravitational flow along its respective side of the boundary. A single exception is at the inception of FW flow at the top of the condenser side of the boundary, where the FW liquid layer is initiated.

Saline Water Supply, Freshwater and Brine Discharge

Figure 6:
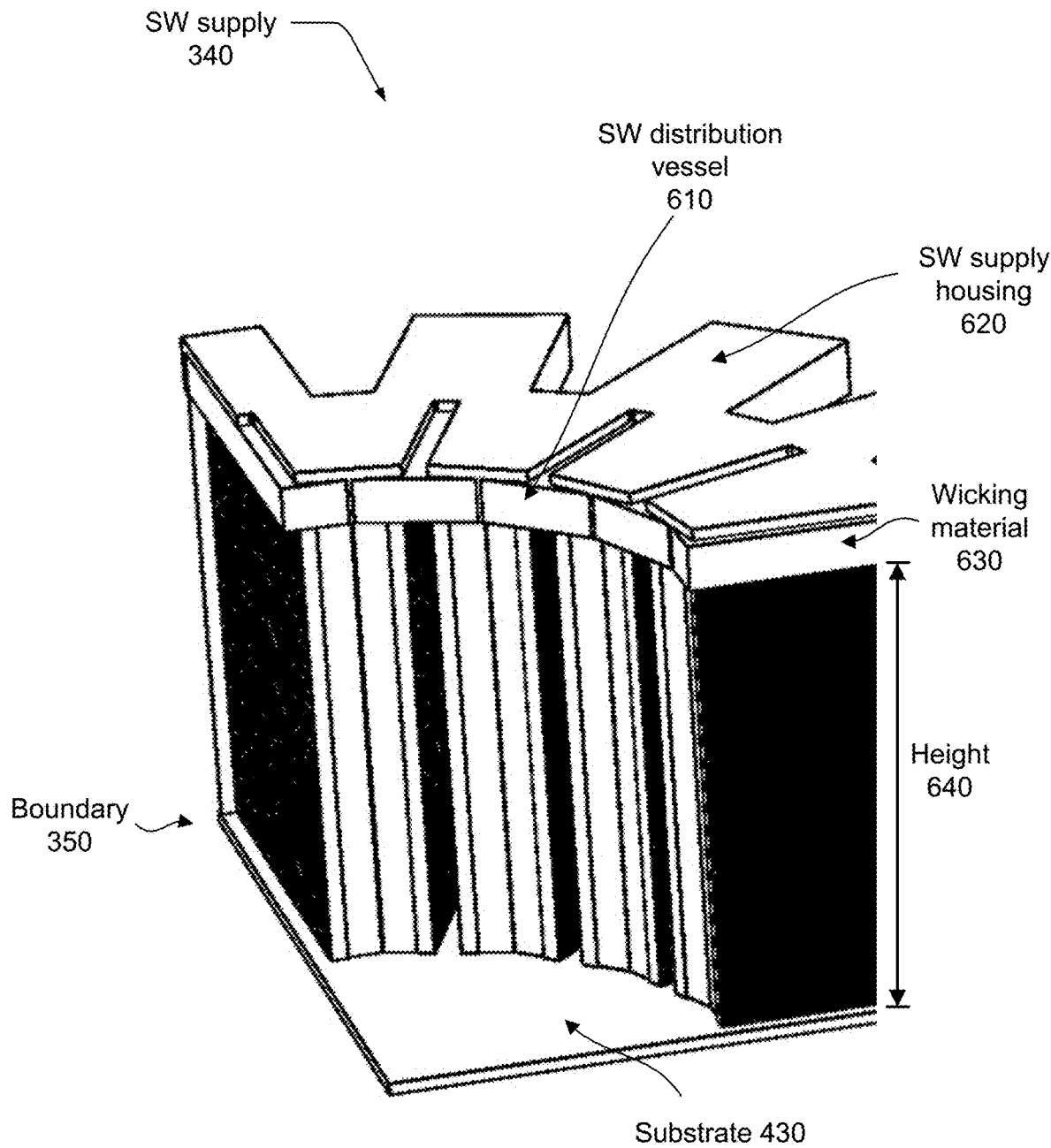
FIG. 6 illustrates an embodiment of a saline water (SW) distribution mechanism.

FIG. 6 depicts an example embodiment of a saline water (SW) supply 340 mechanism for distributing saline water within device 100. Incoming saline water is directed to a saline water (SW) distribution vessel 610 (not visible) that is supported by a SW supply housing 620 at the top of boundary 350. Saline water is distributed evenly across the top edge of the boundary via a wicking material 630 with inherent capillary properties. Examples of types of material that may be used for wicking material 630 are open-cell foams, stacked finely woven screens of metallic, glass, or plastic fibers, as well as random mesh of such fibrous materials. Wicking material 630 is in direct contact with boundary 350 and facilitates the flow of the saline water on evaporation surface 532. The condenser side of boundary 350, is sealed from wicking material 630. Gravity pulls the saline water so that it flows downward on evaporator surface 532 of boundary 350. Due to the function of vapor compressor 108, the evaporator pressure is lower than the vapor pressure of the incoming saline water. Hence, as the saline water flows downward on evaporation surface 532, progressively its liquid water content evaporates, it becomes more saline, and its vapor pressure reduces.

Given an adequately tall height 640 of boundary 350, the evaporation process continues along the flow of the saline water down the evaporator surface 532 until the vapor pressure of the remaining saline water (or brine) reaches the pressure in evaporator space 420 and the evaporation process stops. With a short height 640, brine may be discharged with its vapor pressure still exceeding that of the evaporator space 420. In general, it is strategic to match boundary 350 height 640 to the process parameters, mainly the compressor pressure and volumetric throughput, so that there is no "unused" material at the bottom of the process flow.

Vapor Compressor

Vapor compressor 108 drives the thermodynamic cycle of device 100. Vapor compressor 108 takes the freshwater vapor 114 from the evaporator space 102, raises its pressure and temperature, and delivers pressurized water vapor 116 to condenser space 104. The amount of pressure rise imparted by vapor compressor 108 defines the salinity level of the brine discharge and, hence, the recovery ratio of the desalination cycle. For instance, at standard temperature of 25° C., a 109 Pa (0.44 inWg) rise in pressure generates brine with 6% salinity, whereas a 720 Pa (2.9 inWg) rise in pressure generates brine with about 26% salinity, which corresponds to saturated brine at 25° C.

Figure 7:
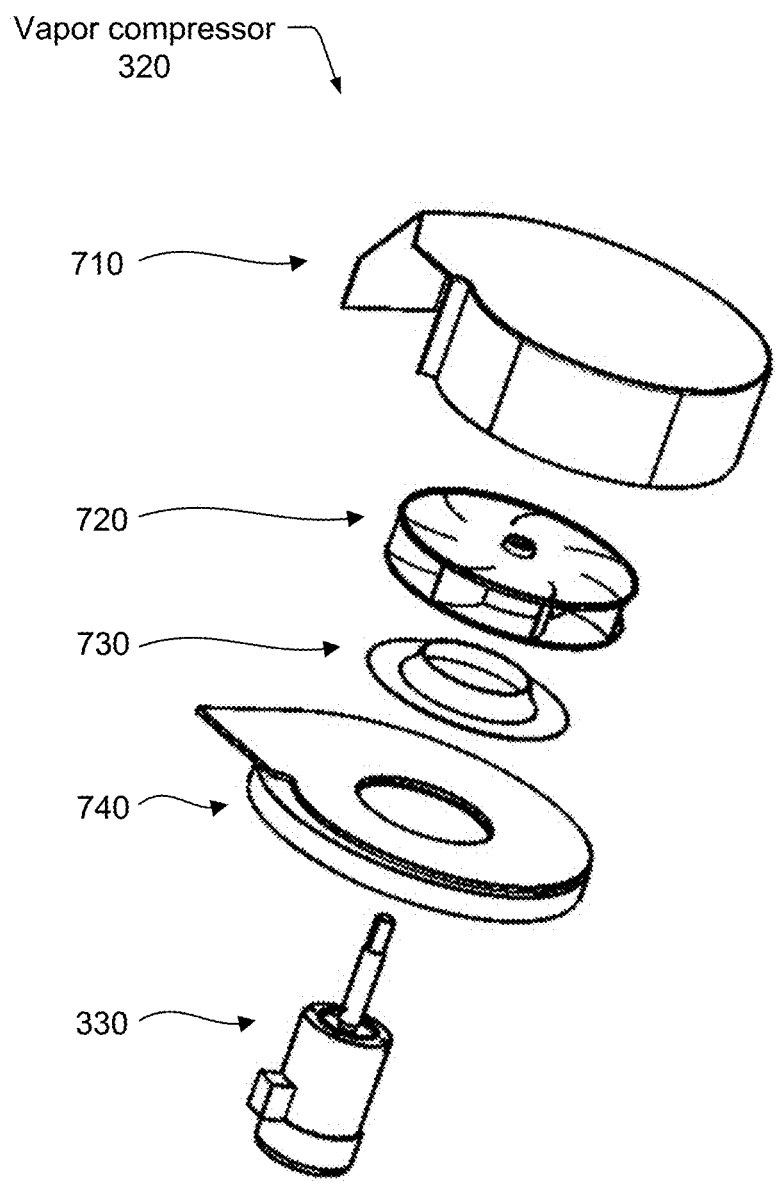
FIG. 7 illustrates one embodiment of a compressor motor, impeller, scroll, and inlet cone assembly for the desalination device.

FIG. 7 provides further details about vapor compressor 320, which is an embodiment of vapor compressor 108. Vapor compressor 320 uses a centrifugal impeller 720, since such devices are well suited to working at the noted pressure rise levels. Impeller 720 is driven by electric motor 330 that is mechanically connected to the impeller. FW vapor 114 enters impeller 720 in the axial direction and leaves in the radial direction. Impellers with backward curved blades, airfoil type blades, and any other possible configuration are relevant for this design.

For a given impeller angular velocity and working fluid density, the volumetric flow rate and the pressure rise of an impeller are, respectively, linearly and quadratically proportional to the impeller angular velocity. As an example, if the impeller of a compressor is spun 2.5 times faster, it will be able to provide more than 6 times the pressure rise. Such an increase in pressure rise dramatically increases the available recovery ratio of a desalination system, say from 50% to upward of 90%, by allowing for increased salinity of the discharged brine to levels close to its saturation limit (about 25% dissolved salt by weight ratio). Such performance increases the freshwater throughput and reduces the amount of brine discharge, both of which are essential to increase the water generation density of the system and reduce its operation cost.

Increasing angular velocity of the impeller imposes additional stress on the impeller material and linkages due to the increased centrifugal forces. Therefore, as the impeller is spun faster, the centrifugal force increases quadratically, imparting greater tensile stresses on the body of the impeller. These stresses must be kept within the acceptable range prescribed by the mechanical properties of the impeller material, construction, and design. In order to compensate for the increase of the centrifugal forces and the associated stresses on the material, one approach is to manufacture the impeller from a material with lower density but comparable mechanical strength. Composite materials are considered an appropriate candidate. For instance, carbon-fiber-epoxy composite has a density in the range of 1,400-2,000 $kg/m^3$ and tensile strength of about 900-1,000 MPa. Compare these figures with 8,000 $kg/m^3$ and 200 MPa of 317L stainless steel. This simple comparison shows that if the material of an impeller is changed from stainless steel to carbon-fiber-epoxy composite, the impeller can be spun at about 4.5 times faster to generate about 20 times more pressure rise without changing the mechanical dimensions of the impeller.

Furthermore, to boost the pressure characteristic and performance of a centrifugal impeller it can be operated with a scroll. Scroll 710 and scroll bottom plate 740 form an enclosure that is properly sized and designed to house centrifugal impeller 720. At the inlet of the scroll, a short cone-shaped circular inlet duct, referred to herein as inlet cone 730 is employed. Inlet cone 730 straightens the flow of the FW vapor 114 and guides it to the inlet of impeller 720. In a centrifugal impeller, fluid, i.e. FW vapor 114, enters axially at the center of the impeller and falls on the impeller blades. The fluid is then spun tangentially and radially by the impeller blades outward until it leaves the impeller. While passing through the impeller, the fluid gains both velocity and pressure.

Impeller Arrangements

Vapor compressor 320 can be comprised of one or more impellers or impeller-scroll assemblies. They can be arranged in series or parallel combinations or in a mix of parallel or series combinations.

Figure 8:
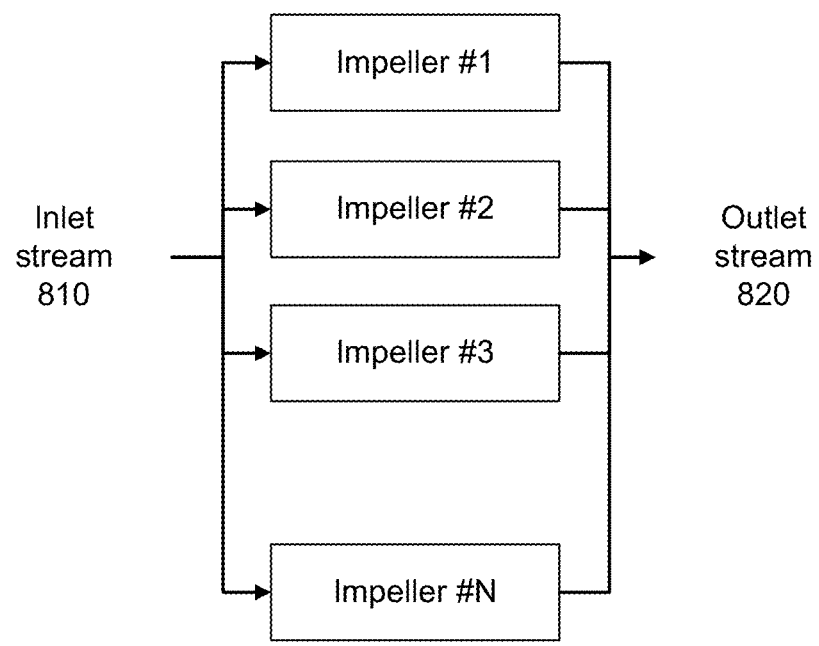
FIG. 8 illustrates the concept of using a parallel combination of compressor impellers.

FIG. 8 illustrates one embodiment of a parallel combination of impellers. In this arrangement, inlets of all impellers are connected together and to a main inlet stream 810 of vapor compressor 320 such that the compressor incoming stream is distributed among the impellers. Similarly, outlets of all impellers are connected such that their outgoing streams are combined together into an outlet stream 820 of vapor compressor 320. This arrangement scales the volumetric flow rate of the impellers by adding the volumetric flow of the impeller units that are in parallel.

Figure 9:
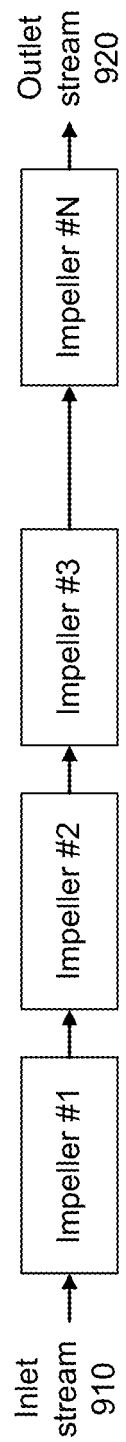
FIG. 9 illustrates the concept of using a series combination of compressor impellers.

FIG. 9 shows the concept of a series combination of impellers. In this arrangement, the outgoing stream of one impeller is connected to the incoming stream of the following impeller. A main incoming stream 910 of vapor compressor 320 enters the first impeller and an outgoing stream 920 of the last impeller becomes the outgoing stream of vapor compressor 320. This arrangement scales the pressure rise of the impellers by adding the pressure rise of the individual impeller units that are in series.

In general, with multiple impellers arranged as needed, impeller dimensions and speeds can be configured to optimize the performance.

System Operation at Higher Temperature and External Regeneration

As stated above, the outlined thermodynamic cycle of the desalination system can operate at many practical temperatures, as determined by the saline feedwater. A rise in the operating temperature raises the average operating vapor pressure within the system. The rate of the pressure rise for water vapor is much faster than the rate of its temperature rise, approximately exponential over the typical ambient range. As a result, based on the principles governing ideal gases, the water vapor density also increases as a function of the temperature, approximately in proportion to the vapor pressure. Therefore, for a given volumetric flow through vapor compressor 108, device 100 throughput of freshwater can increase dramatically with increasing operating temperature. Specifically, increased average temperature and pressure enables the compressor 108 to provide increased mass flow rate approximately in proportion to the increased density of the vapor. Achieving an increase in overall throughput also requires that the evaporator-condenser subsystem has the needed capacity.

Figure 10:
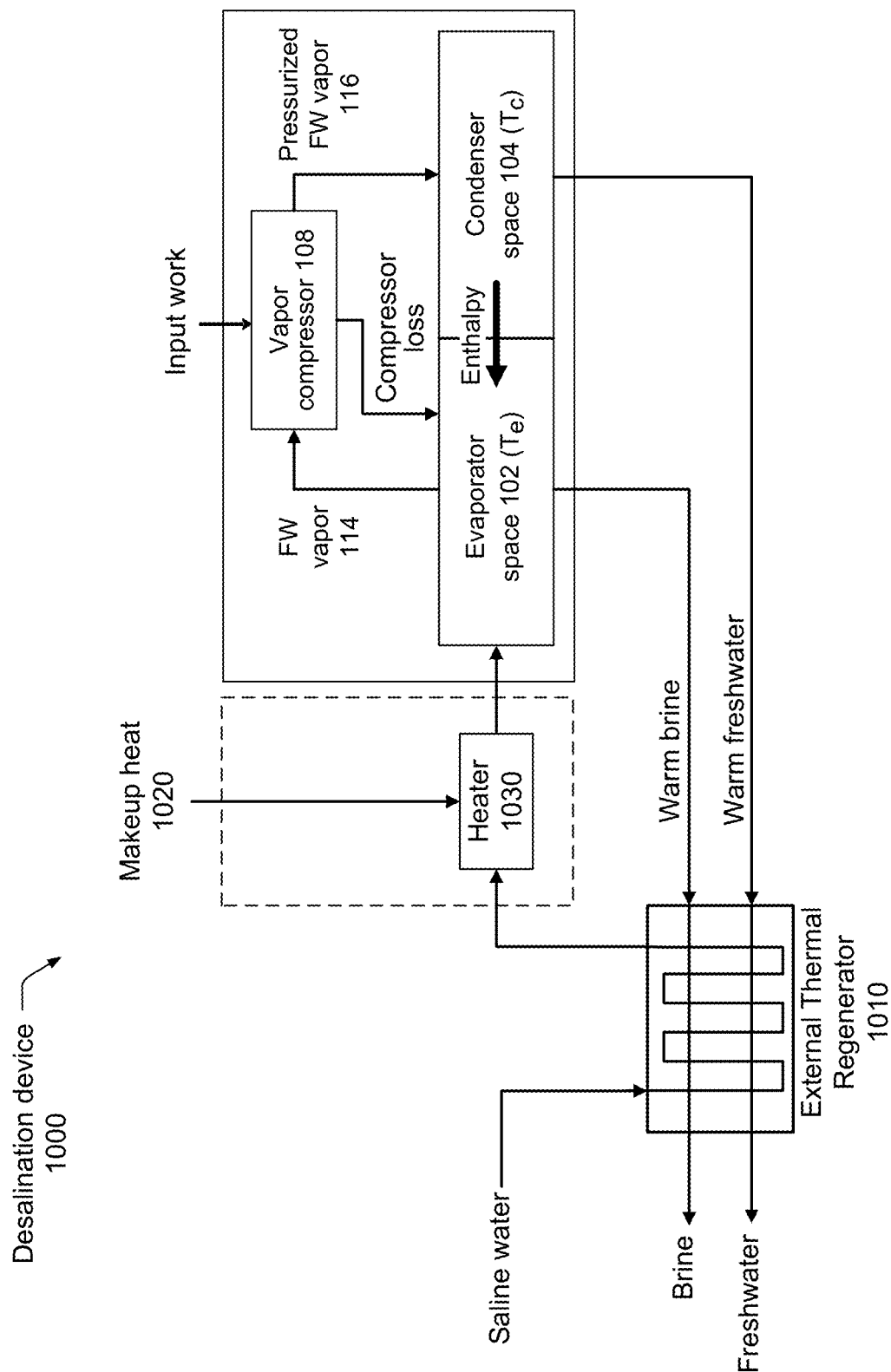
FIG. 10 is a block diagram of an embodiment of the desalination system with higher-than-ambient operating temperature and an integrated external thermal regeneration unit.

When the system operates at a temperature higher than ambient, FW 112 and brine discharge 118 leave device 100 at higher temperature as well. FIG. 10 illustrates an embodiment of a desalination device 1000 with an external non-mixing thermal regenerator 1010 that recovers the thermal energy, based on enthalpy exchange, from outgoing condensed freshwater and brine streams, and which uses the recovered thermal energy to increase the temperature of the incoming saline water stream. Regenerator 1010 incorporates a regenerative heat exchanger (e.g., counter-flow) for transferring heat from the outflowing freshwater and brine streams to the incoming saline water stream. With high effectiveness of such a regenerator, only a small amount of make-up heat 1020 needs to be supplied externally, for example by a heater 1030, to keep the operating temperature of desalination device 1000 at a desired higher-than-ambient level. In fact, with an appropriately effective regenerator, dissipation within the vapor compressor 108, also referred to as compressor loss, may be adequate to provide all of the required make-up heat. If not, make-up heat 1020 may be supplied from an external energy source such as primary electric heating, combustion heating, by a thermal waste heat stream (e.g., from a co-located thermal process), and/or by solar-thermal heat input.

Deaeration of the Incoming Saline Water

Along with the incoming saline water, some amount of dissolved gases (mostly air) enter device 100. During the distillation (desalination) process, these gasses will be released and may not leave the chamber 120 as part of FW 112. As a result, the average pressure of the desalination process may increase gradually over time. Despite the gradual rise of the average pressure in device 100, if the average temperature of the process does not change, the partial pressure of the water vapor and its density remain unchanged. Hence, vapor compressor 108 does more work to compress the mixture of the water vapor and the unwanted gases. This increases the work requirement of device 100, making it less energy efficient.

A simple deaeration stage on the incoming saline water stream, SW 110, can be used to remove the dissolved gases from the saline water before entering the system. A deaerator is an apparatus that mechanically agitates the liquid causing small gas bubbles in the liquid to combine, forming larger bubbles, that then rise to the top surface of the liquid and burst away. The agitation can be realized by different approaches, including but not limited to, a small rotating agitator, or ultrasound actuation using piezoelectric actuation. The important fact is that the agitation should be subtle, and it should take place at a depth sufficiently away from the liquid surface to avoid mixing of more gas into the liquid. To ensure that the dissolved gasses that rise to the top of the liquid are removed from the deaerator, the deaeration procedure can be conducted in a weak-level vacuum to help pull the gases out of the system.

Alternatively, desalination chamber 120 may be evacuated periodically to remove the unwanted accumulated air. A simple roughing vacuum pump can suffice for this, and this can avoid need for a deairing stage. The roughing vacuum pump may also be used for system start-up.

System Control

As described earlier in this document, the pressure rise of vapor compressor 108 defines the salinity level of the discharged brine 118. It was also described that the volumetric flow rate and pressure rise of vapor compressor 108 are, respectively, linearly and quadratically proportional to the angular velocity of the impeller. Therefore, the impeller characteristic and speed and consequential pressure rise is considered one independent control variable in this system which controls the asymptotic limit of the brine salinity. The impeller characteristic and speed also control the vapor flow rate, and hence the mass flow rate of vapor and the volume of generated freshwater 112.

The second independent control variable is the flow rate of the input saline water 110. For a given design of boundary 106, there is a specific saline water 110 flow rate that sets the salinity of the discharged brine to the expected asymptotic level defined by the operating temperature and the vapor compressor pressure rise. Less SW 110 flow allows attainment of the asymptotic brine salinity, whereas greater flows result in brine with lower salinity at the exit of the evaporation process. All operating points have merits, and effectively trade-off recovery rate, required specific energy input, and freshwater production rate.

In certain embodiments, the flow of incoming saline water 110 is controlled by a pump 124. In other embodiments, a valve placed in series with saline water 110 may be modulated, in place of SW pump 124.

Figure 11:
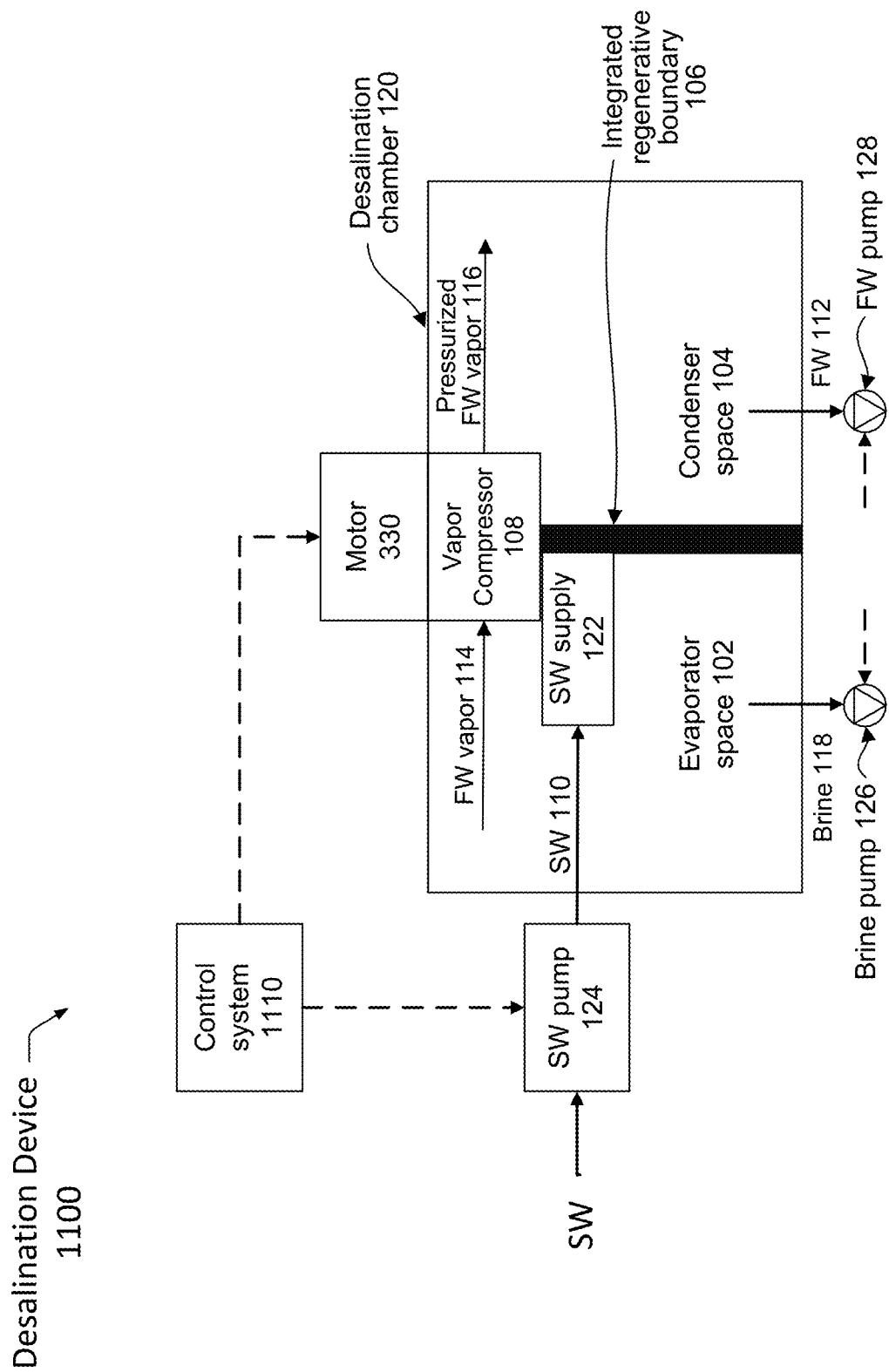
FIG. 11 is a block diagram of a control system for the desalination device.

FIG. 11 illustrates an embodiment of a desalination device 1100 with a feedback control system 1110 that controls and optimizes the flow rate into device 1100 of saline water 110. The flow rate may be optimized for a variety of goals, including inter alia regulating the salinity of the discharged brine to a specific value, maximizing the freshwater generation rate, minimizing the specific energy of the desalination process and so on. In some cases, it may be strategic to operate the compressor at its rated speed, and to slowly adjust the input feed rate of saline water to keep the system at its intended operating point.

Device 1100 is an embodiment of device 300 with the addition of control system 1110. Control system 1110 may be implemented as a circuit board with a processor, static and dynamic memory for storing program code and data. Control system 1110 further has control signal lines and may also have flow sensors and other sensors. Control system 1110 controls vapor compressor 108 by controlling motor 330 that is directly attached to impeller 720 of the vapor compressor 108. Control system 1110 controls the flow rate of SW 110 by controlling the speed of SW pump 124. Control system further controls brine pump 126 and FW pump 128 to adjust the brine 118 and FW 112 levels inside desalination chamber 120.

Multi-Stage Desalination System

Figure 12:
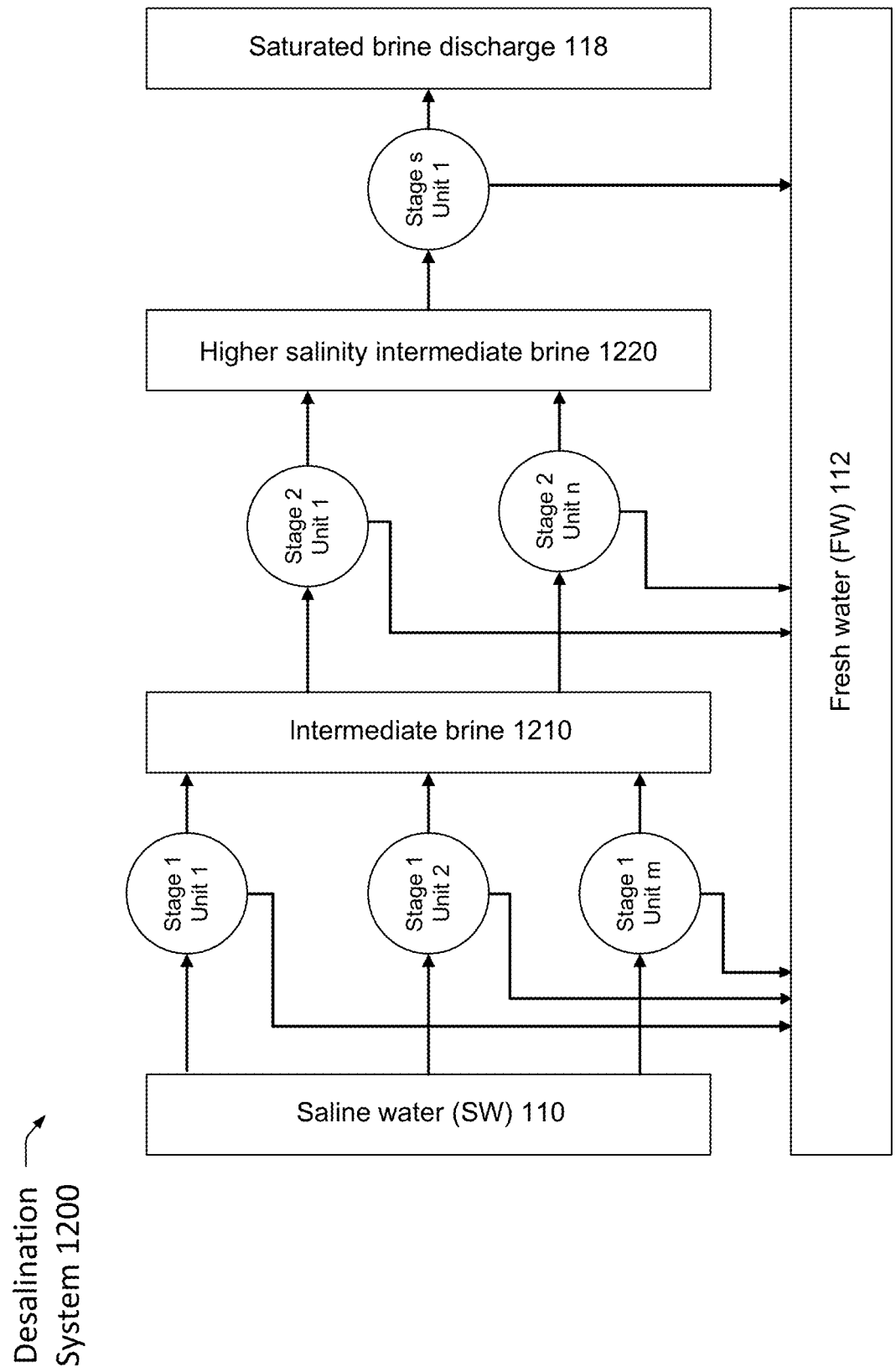
FIG. 12 is a block diagram of an embodiment of a multi-stage arrangement of desalination devices.

It is desirable to maximize the recovery ratio of a desalination process, which corresponds to increasing the salinity level of the discharged brine. However, as the gap between the salinity of saline feedwater and rejected brine grows, with a single stage system, the energy of desalination gradually deviates from the theoretical limit. However, desalination does not have to be implemented all in one stage. A multi-stage execution proves to be both energy and cost efficient. FIG. 12 is a block diagram of an embodiment of a multi-stage desalination system 1200. In multi-stage desalination system 1200 each stage includes one to several units of desalination device 100, arranged in parallel. In certain embodiments, the desalination units within each stage are identical; in other embodiments, they may differ. Desalination units within each stage share the salinity level of the incoming saline water and produce brine at the designated output salinity level. Although parallel units may be matched in characteristics, this is not a necessity. However, energetic efficacy would guide toward keeping produced brine salinity levels equal for units within a given stage.

As brine advances through the multi-stage system, the brine volume decreases with each stage of processing and, as a result, the number of units in each stage reduces as well. Desalination device 100 can serve in any stage, because, with proper control of the vapor compressor, system 100 can discharge brine at any desired salinity level up to the maximum possible level corresponding to the saturated level of the saline water. Furthermore, each unit can employ any desalination technology of interest, e.g., reverse osmosis, and so on. However, an optimal multi-stage system performance might impose certain constraints on the operating conditions of each stage and, hence, each unit within that stage. Moreover, any technology might not be suited to serve in any stage of a multi-stage desalination system. For instance, membrane-based reverse osmosis (RO) systems are practical to discharge brine at salinity levels of up to 6-7%, thus, they will only be suitable for the first stages in the system.

For instance, achieving 98.5% recovery ratio by desalinating brackish water and discharging saturated brine will require 10 kWh/m$^3$ energy, if performed in one stage. However, if the same task of achieving 98.5% recovery is conducted in two stages where the first stage discharges brine at 4.5% salinity (85% recovery ratio) and the second stage discharges saturated brine (89% recovery ratio) the total required energy is 2.3 kWh/m$^3$, including all non-idealities and inefficiencies. This figure is 2-3 fold superior to the seawater RO process that has a modest recovery ratio of 50%. Needless to say that adding a third stage will further reduce the total desalination energy and the energy will asymptotically approach the thermodynamic limit as the number of stages increase.

The total mass flow of salts remains constant across the brine flow streams shown in FIG. 12. Thus, as brine advances through the system, the brine volume decreases with each stage of processing. Thus, in an exemplary system, with only two stages, the first stage may parallel many identical units, while the second stage has fewer paralleled units, perhaps only one. Further, since the energy requirement to process more concentrated brine increases sharply with brine concentration, the exemplary two-stage arrangement is efficient since the high concentration second stage handles much less volume input flow than that of the first stage.

System 1200 illustrates a reduced brine volume at each of three stages. SW 110 enters system 1200 at the far left. After one stage of processing an intermediate brine 1210 has been created. After a second stage of processing a higher salinity intermediate brine 1220 has been created. After a final stage, referred to as stage s, a saturated brine discharge 118 is left which typically is removed from system 1200 by one or more brine pumps (not shown).

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

TABLE 1

| Temperature-Entropy Steps | | | |
|---|---|---|---|
| Transition | FW/SW | | Process steps |
| State 1 -> 2 | SW | 1a | Incoming liquid SW 110 enters evaporator space 102 of device 100. |
| | | 1b | SW supply 122 directs SW 110 to flow down evaporator surface 132 inside evaporator space 102. |
| | | 1c | SW 110 (state 1) enthalpy is increased until it becomes saturated vapor (state 2). |
| | | 1d | A portion of the water content of SW 110 is evaporated as FW vapor 114. |
| | | 1e | Residual SW 110 with higher salinity is collected and removed from evaporator space 102 as brine 118. |
| State 2 -> 3 | FW | 2a | FW vapor 114 enters vapor compressor 108 (state 2) and leaves it as pressurized FW vapor 116 (state 3) into condenser space 104. |
| | | 2b | To increase the pressure and temperature of the FW vapor, vapor compressor 108 consumes energy/work W_c. |
| State 3 -> 4 | FW | 3a | Pressurized FW vapor 116 enthalpy is reduced on condensation surface 134. |
| | | 3b | As FW vapor 116 (state 3) condenses to liquid (state 4), it flows on condensation surface 134 and is collected and removed from condenser space 104 as FW 112. |

What is claimed is:

1. A desalination device, comprising:
   a sealed desalination chamber that comprises two compartments:
     an evaporator space that contains saline water; and
     a condenser space that contains fresh water, wherein the evaporator space is inside the condenser space;
   a saline water distribution mechanism within the chamber for receiving incoming saline water and directing it into the evaporator space;
   a vapor compressor within the chamber that receives freshwater vapor from the evaporator space and directs a stream of pressurized freshwater vapor into the condenser space; and
   an integrated regenerative boundary that divides the evaporator space and the condenser space, comprising an evaporation surface inside the evaporator space and a condensation surface inside the condenser space, wherein the integrated regenerative boundary is made of a plurality of radial subsections, and wherein each subsection is formed of one folded sheet of a thin film, and wherein the pressurized freshwater vapor condenses on the condensation surface to generate freshwater, and wherein the latent heat of condensation transfers across the integrated regenerative boundary into the evaporation space, and wherein the transferred heat evaporates the saline water inside the evaporator space.

2. The device of claim 1, further comprising:
   an external saline water pump or valve that controls the flow of external saline water into the saline water distribution mechanism;
   a freshwater pump that pumps fresh water out of the condenser space; and
   a brine pump that pumps residual brine out of the evaporator space.

3. The device of claim 2, further comprising:
   a thermal regenerator, external to the desalination chamber, that recovers heat from the outgoing brine and freshwater and transfers the recovered heat to the incoming saline water.

4. The device of claim 1, wherein the vapor compressor is configured to maintain a temperature differential between the condenser space and the evaporator space of less than 2 degrees Celsius.

5. The device of claim 1, wherein the integrated regenerative boundary comprises a plurality of folded sheets of thin film.

6. The device of claim 5, wherein the thin film is made of a material selected from the group consisting of a stainless steel alloy, a coated metal, plastic and nylon.

7. The device of claim 1, wherein each of the two surfaces are treated with a hydrophilic coating.

8. The device of claim 5, wherein one side of each folded sheet of thin film forms a part of the evaporation surface and the other side of each sheet forms a part of the condensation surface, and wherein each folded sheet of thin film has a pitch range of 1-5 mm.

9. The device of claim 1, further comprising an electric motor that provides energy to the vapor compressor.

10. The device of claim 9, wherein the vapor compressor comprises a centrifugal impeller.

11. The device of claim 10, wherein the vapor compressor further comprises a scroll that houses the impeller.

12. The device of claim 1, wherein the saline water distribution mechanism comprises:
    a distribution vessel into which the saline water is directed; and
    a wicking material that distributes the saline water across the top edge of the boundary.

13. The device of claim 1, wherein the only energy supplied to the thermodynamic cycle is by the vapor compressor and is used to pressurize the freshwater vapor.

14. The device of claim 1, wherein a residual saline water, which does not evaporate as it flows downward along the evaporation surface, flows to the bottom of the evaporator space.

15. A system for desalinating water, comprising
    an incoming stream of saline water;
    a plurality of stages that progressively desalinate the incoming supply of saline water, wherein each stage comprises at least one desalination device and wherein each of the at least one desalination device in each stage is a distinct device, and wherein at least one of the plurality of stages comprises a device of claim 1, the plurality of stages comprising:
    a first stage, configured to:
        receive a portion of the incoming stream of saline water;
        perform a desalination process on the incoming stream of saline water to generate (1) a first volume of brine; and (2) a first volume of fresh water; and
        remove the first volume of fresh water; and
    a second stage, configured to:
        receive the first volume of brine;
        perform a desalination process on the first volume of brine to generate (1) a second volume of brine, wherein the salinity level of the second volume of brine is higher than the salinity of the first volume of brine; and (2) a second volume of fresh water; and
        remove the second volume of fresh water.

16. A process for the desalination of water, comprising:
    receiving incoming saline water into an evaporator space inside a sealed chamber, wherein the chamber comprises the evaporator space and a condenser space, and wherein the evaporator space and the condenser space are separated by a boundary, the boundary comprising an evaporator surface within the evaporator space and a condenser surface within the condenser space, wherein the boundary is made of a plurality of radial subsections, and wherein each subsection is formed of one folded sheet of a thin film, and wherein the evaporator space is inside the condenser space;
    enabling the incoming saline water to flow down the evaporator surface;
    transferring a latent heat of condensation from the condenser surface across the boundary to the evaporator surface;
    evaporating a portion of the saline water as it flows down the evaporator surface to become freshwater vapor;
    pressurizing the freshwater vapor by a vapor compressor;
    directing a resulting stream of pressurized freshwater vapor into the condenser space;
    removing enthalpy from the pressurized freshwater vapor by a condensation surface inside the condenser space;
    condensing the pressurized freshwater vapor on the condensation surface to create freshwater, wherein the condensing generates the latent heat of condensation; and
    controlling the stream of pressurized freshwater vapor to raise the temperature within the condenser space to no more than 2 degrees Celsius compared to the temperature inside the evaporator space.

17. The process of claim 16, further comprising:
    pumping external saline water pump into the evaporator space.

18. The process of claim 16, further comprising:
    discharging the fresh water from the condenser space; and
    discharging residual brine from the evaporator space.

19. The process of claim 16, wherein the incoming saline water temperature is in the range of 10 degrees Celsius to 30 degrees Celsius and the pressure inside the sealed chamber is in the range of 1% to 5% of ambient pressure.

* * * * *